Sept. 2, 1941.   A. H. KÄMPFER ET AL   2,254,686
APPARATUS FOR PRODUCING ADDITIVE COLOR FILMS
Filed Oct. 4, 1938

Inventors:
A. H. Kämpfer and
A. Schattmann
by Watson Coleman

Patented Sept. 2, 1941

2,254,686

UNITED STATES PATENT OFFICE 2,254,686

APPARATUS FOR PRODUCING ADDITIVE COLOR FILMS

Adolf H. Kämpfer, Berlin, and Albert Schattmann, Charlottenburg, Berlin, Germany Application October 4, 1938, Serial No. 233,310
In Germany October 8, 1937

1 Claim. (Cl. 88—16.4)

This invention relates to a method of producing additive color films, in which the copies employed for reproduction purposes possess within the frame of a normal cinematograph film four similar images of equal size, but recorded with different light-intensity values. These images may comprise, for example, three color records and a black-and-white image.

The method of production according to the invention makes provision for a novel form of optical separating system exhibiting the least possible loss of light, by means of which four narrow-film negatives, each two of which form a bipack, are so produced by simultaneous exposure during the exposure period that on the said narrow films, which have their sensitized layers directed towards each other in pairs and are advanced in common, there are recorded four completely identical and independent images of equal size having different intensity values in accordance with the desired color of black-and-white impressions. These single images, following separate development of each single strip of negative film in accordance with its exposure, are so copied according to a copying process, which has already been described previously, on to the positive strip of film that the latter contains in each case the four simultaneously recorded images of equal size within the space of a normal cinematograph frame, the space for the sound track being left blank. These four single images forming a group and representing different color or black-and-white impressions are then made to register on the projection screen without fringes by the use of a previously proposed projection method.

It is the object of the invention to develop a method which avoids an essential drawback of all previous methods of producing additive color films, viz., the loss of light intensity, and in carrying this method into effect there is achieved at the same time, in addition to a considerable increase in the light-intensity value of the complete picture, a handy form of the recording apparatus and also a suitable disposal of the single color-component images on the positive film.

Further, the invention sets forth precise rules as regards the arrangement and sequence of the differently sensitive narrow-film negatives in relation to the divided bundle of rays, which rules enable the aesthetical demands placed on a color film adapted to provide a really natural reproduction to be fulfilled to a high degree.

It is known in the art to produce additive and subtractive color films having more than two color-component records by producing, by separation of the rays, two different bundles of rays, each of which is employed separately for the exposure of bipack films. Thus, for example, it has been proposed to conduct two bipack films of normal size disposed at 90° in relation to one another past a known ray-dividing system for the purpose of exposure, in which connection, with consideration to difficulties encountered upon the development, the two bipack films are furnished with similar emulsion. Apart from the fact that in accordance with more recent recognitions in the photographic art it is for color-technical reasons not economical and also not desirable to record differently filtered color values on similar film material, the selection in this case of two bipack films of normal width also exhibits the disadvantage that the accommodation of two bipacks of this nature, which moreover are disposed at 90° to one another, within a recording apparatus necessitates dimensions of the apparatus which cause the manipulation of the same to be extremely difficult. Further, the known method also relates to the recording of subtractive color films with all the drawbacks and difficulties including the numerous coloring operations and the like, attendant on the copying of the negative images on to the positive film material. The use of aniline dyes, which are necessary in these color films, also imparts to the final color image an exaggerated color impression of such nature that despite careful toning of the single coloring means the final image always produces a gaudy in place of a natural reproduction.

A further essential disadvantage of this arrangement resides in the fact that there is a very considerable loss of light both in the optical dividing system as well as in the film material employed, whilst at the same time the total impression of a color film of this nature, from the point of view of light intensity, is much inferior to the light-intensity values of ordinary film reproductions. The reason for this consists in the fact that in the conventional type of ray-dividing system employed the separation of thoroughgoing and reflected rays is obtained by means of partial or divided reflective faces which alternate with light-transmissive faces. It is known in the optical art that a reflective surface exhibits considerable losses of light as compared with totally reflecting prismatic faces, so that the ratio of the ray separation in optical systems of this kind is not as of 50:50 but, in view of the losses involved, possesses a smaller proportion on the transmissive side, to impart a higher proportion to the reflected rays, this difference then being so compensated by the loss of light upon the reflection that in the end effect the two divided bundles of rays again have the same intensity values. In these arrangements, therefore, the light-intensity value of both the throughgoing rays as well as the reflected rays is purposely limited. The additional loss of light in this arrangement is due to the fact that the normal film material selected in this arrangement possesses a considerably density, which in itself causes a certain proportion of the light to be absorbed.

It has also been proposed in a recording system making use of separation of the rays and two bipack films to convert the vertical displacement of the two reels of film by the inclusion of an optical reflection in the ray dividing system into two adjacently disposed reels of film, and at the same time to dispense with the use of one single emulsion for all four color-component images, providing both the front films as well as the rear films with different sensitization. The great disadvantages associated with the selection of a normal cinematograph frame for the size of a color-component image have not been taken into consideration, so that it is necessary to employ either two bipack films of normal size placed side by side or a bipack film of double width. Both of these measures result in the stated unsatisfactory size of the recording apparatus.

Another proposal employs for the first time a bipack film of normal width, on which there are located two adjacently disposed color-component images which, however, are situated sideways and extend beyond the area of a normal cinematograph frame. The bipack is so exposed by separation of the rays that separate fields are assigned to each bundle of rays. At the same time, however, with a view to unitary film material, the front film and the rear film are furnished with chromatically equal emulsions. For example, it is necessary to employ for the front film, on which a green and a blue component record are to be produced side by side, a uniform emulsion which is equally sensitive for both green as well as blue. In consequence it is impossible for color-chemical reasons to select a full color sensitivity for each color component, and a selection must be made midway between the best results obtainable with respect to the two different colors.

A further disadvantage attendant on two color-component images, which are arranged with their narrow sides disposed horizontally and although located on a normal film for the purpose of reproduction necessitate an advance of the film by more than twice the normal height of a frame, consists in the fact that a given length of film will not provide the same number of complete exposures as an ordinary black-and-white film. Apart from the necessity for employing a bipack film the cost of taking a film is also increased owing to the greater length of material required for a given number of records. The reproducing apparatus is also entirely different to the usual type, as the component images having their narrow sides disposed horizontally must again be converted into images of normal disposal. In addition much wider projection systems are required.

To avoid the disadvantages aforesaid it has already been proposed by the applicants to employ a bipack film having different emulsions corresponding to the particular color values to the left and right of the centre line, differentiation in the color sensitivity also being made between the front and rear films. In this connection it was proposed for the first time to accommodate four color-component images within the space of a normal cinematograph frame, so that upon the recordal, owing to the separation of the rays, two normally disposed color-component images of half the height of a normal frame are accommodated on a film of normal width. The only difficulty still existing in this arrangement consists in the fact that it is extremely difficult in the production of the film material to apply layers of different sensitivity to the left and right of the centre line of the film. It is quite well known to apply to the left and right of the centre line of a film different colors adapted to act as filters, but the provision in similar fashion of differently sensitized emulsions is confronted by considerable difficulties.

All solutions proposed heretofore have in common the loss of light above referred to, arising from separation of the rays by reflective systems or from the density of normal film material. The present invention avoids the difficulties hitherto encountered by the use of material of narrow width as a basis for the bipack film, permitting of convenient design of the recording apparatus and of a convenient method of performing the copying process, in addition to which by the provision of an optical separating system in conjunction with the said narrow film material there is obtained the considerable advantage that the light losses hitherto incurred are practically wholly avoided.

The invention also includes a solution in which each bundle of rays produced by the optical separating system is confronted by a different chromatically selected emulsion, by means of which there is obtained upon the projection of the color film an optimum effect adapted to comply with the aesthetic demands of an audience in the matter of color.

The invention conveys fundamentally the recognition that it is desirable so to design a ray-dividing system that in place of a distribution of reflective and non-reflective faces it is furnished by a grinding operation with totally reflecting faces and light-transmissive faces in alternate disposal. If a prism is ground in this form, of the bundles of rays leaving the prism through the different prism outlet faces distributed over the outlet area those rays which are directed at an angle of 45° or 60° will be totally reflected without loss of light, whilst those impinging on adjacently disposed ground faces of 90° will pass entirely through the outlet face. Owing to this proposed form of the prism the first fundamental loss of light hitherto incurred in these ray dividing systems and to which there are afterwards added the additional losses resulting in the recording operation is avoided.

By the proposal to employ narrow-gauge film material as a basis for the bipack film it is accomplished that in the provision of four color-component images accommodated within a normal cinematograph frame there can be assigned to each color component a separate narrow film, which as regards its emulsion is adapted to the particular color concerned.

In this connection it has been found that in addition to the color-chemical advantages there is also obtained the advantage that the recording apparatus then required may then be made so handy in the form that it may even be smaller than a camera for normal black-and-white exposures. The projection apparatus also merely requires to be augmented by frontal auxiliary apparatus of a minor kind, and it is unnecessary that the capital invested in cinema theatres in the projection apparatus be written off as a loss upon the introduction of color films. This capital does not deteriorate, as the projection apparatus remains the same, and merely the optical systems require to be exchanged. An additional feature which is not to be ignored resides in the fact that in selecting a narrow film material as a basis for the bipack material the two narrow films can be mounted coaxially without difficulty in the recording apparatus and can be advanced by the same means.

A feature of very considerable importance consists in the fact that for the first time there is overcome the drawback associated quite generally with the use of bipack material, wherein owing to the large image gate the loosely connected bipack material readily tends to warp at the centre and consequently to produce a lack of sharpness in the image. In the case of a small image gate, such as represented by a normal cinematograph frame divided into four sections, and which moreover is somewhat less than the image gate corresponding to a frame of the narrow film, the advantage is obtained that the bipack material is held in a completely flat condition without obstruction to the advance of the film and without tendency to warp.

Upon the copying of all four component images in a group on a common positive film the use of a narrow-film image gate also permits of such a disposal of the images on the film that sharp separation is obtained between the single component images without overlapping or a reduction in size as compared with the original, and in such a manner as to allow for accommodation of the sound track, which may be applied separately or otherwise as desired.

In addition to the said advantages arising from the use of narrow-gauge films there is a further advantage consisting in the fact that, as well known, narrow-gauge films consist of a much thinner and accordingly much more light-transmissive material than normal films. The exposure as regards both the emulsion of the front film situated behind the front support as well as the emulsion of the rear film can accordingly take place with better intensity values than in the case of a film of normal width and normal thickness. In this way, therefore, a considerable proportion of the light losses incurred by the four-color exposure is again compensated.

According to the invention, therefore, it is proposed for the production of additive color films, in which by the use of doubly dividing optical systems four color-component images are accommodated in the positive copy within the space of a normal cinematograph frame, to employ two bipack films composed of films of narrow width having their sensitized faces directed towards each other, and to furnish each bipack with an emulsion adapted to the particular color value.

According to the invention, therefore, pursuant to this arrangement, the one bundle of rays, after passing a yellow filter or a filter layer applied to the front film, acts on the green-recording orthochromatic emulsion on the front film, and following thereon, after passing a red filter layer, on the panchromatic emulsion of the rear film. The second bundle of rays in the case of the second bipack acts first on a non-sensitized emulsion for the blue record, and following thereon on a panchromatic layer, furnished with a colored correction filter, for the production of a black-and-white exposure. In this way there is obtained in convenient fashion a negative record made up of three color-component images and a black-and-white image.

The invention is naturally not limited to this specific sequence of the co-operating color components of a bipack. The sequence with respect to the single bundles of rays may also be the reverse. It will also be obvious that the invention is not limited to the selection of panchromatic and orthochromatic films. A suitable concentration of the emulsion will be provided for each color value as the case may require.

The negatives recorded in the manner described can now be united in ready fashion on a positive film in groups of four within the space of a normal cinematograph frame without variation in the size, the images being so spaced as to permit of the copying of a sound record on to the positive film. A suitable apparatus for the purpose in question can be so designed that the film reels bearing the two bipack films side by side are mounted coaxially and driven in common.

Separate image gates hold each bipack film together, and the films are exposed by way of a ray-dividing system with parallel passage of the rays. The invention, however, does not preclude the possibility of two bipack films disposed behind a ray-dividing system in angular or staggered relation to one another.

Means improving the light-intensity value of the single color-component images may also be provided in conjunction with the recording apparatus so as to shorten the shading period during the advance of the film, the darkening sector being limited to 60° as compared with almost 200° in the case of normal apparatus. This limitation to 60° with respect to the shading sector is also only possible by the use according to the invention of films of narrow gauge. Owing to this measure and the much longer period of lighting a multiple amount of light is available.

The invention will be more clearly apparent from the accompanying drawing, in which—

Figure 1:
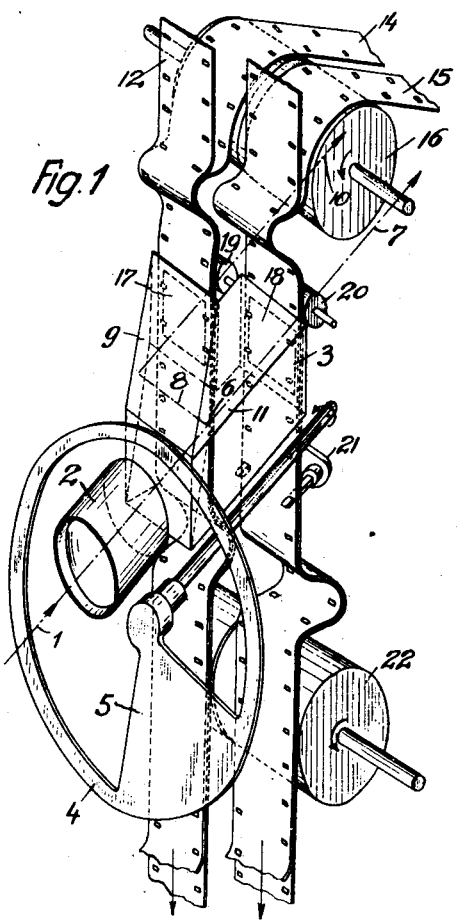
Fig. 1 is a perspective view of pertinent parts of an apparatus adapted for the production of additive color films on bipack material made up from films of narrow gauge.

The light entering the optical system of a camera in the direction of the image axis 1 passes behind the objective 2 into an optical ray-dividing system 3, when the rotary diaphragm 4 disposed between objective 2 and ray-dividing system 3 allows the light to pass. The rotary diaphragm 4 has a darkening sector 5 amounting to approximately 60°, which has been found to be quite sufficient to cover the small advancing movement of films of narrow gauge.

In the ray-dividing system 3 the light 1 is divided at the face 6 into a throughgoing bundle of rays 7 and a deflected bundle of rays 8, which in the present embodiment is again so deflected in the inclined prism 9 that the outgoing bundle of rays 10 is parallel to the throughgoing rays 7.

The part 11 of the ray-dividing system 3, which is assigned to the throughgoing rays 7, is dimensioned in the matter of its length with consideration to the wavelength to be passed through in this way of the color values to be filtered out. Two narrow-film bipacks which each comprise a front film 12, 13 and a rear film 14, 15 are drawn off in parallel disposal from two reels mounted coaxially. These parallel films are engaged by the feed roll 16 and, whilst still maintained in their parallel disposal, are conducted to the outlet faces 17, 18 of the ray-dividing system. At these faces the bipacks are held by rolls 19, 20 and are advanced in the shading sector by engagement with suitable conveying means 21, whereupon they are moved past the driving roller 22 and conducted in the conventional fashion in the direction of the arrows to the winding reels.

In Fig. 1 the bipacks, for the same better comprehension, are shown in separated condition at the roll 16, whereas actually when passing about the roll 16 the front and rear films of the bipack are pressed tightly together.

The front film 12 of the left hand bipack possesses an orthochromatic green-recording emulsion, and on the emulsion side a red-filter layer. The rear film 14 is furnished on the side directed towards the light with a red-sensitive emulsion. In the second bipack the front film 13 possesses a blue-sensitive emulsion, and the rear film 15 a panchromatic emulsion. Both bipacks 12, 14 and 13, 15 have their sensitized layers directed towards each other.

Figure 2:
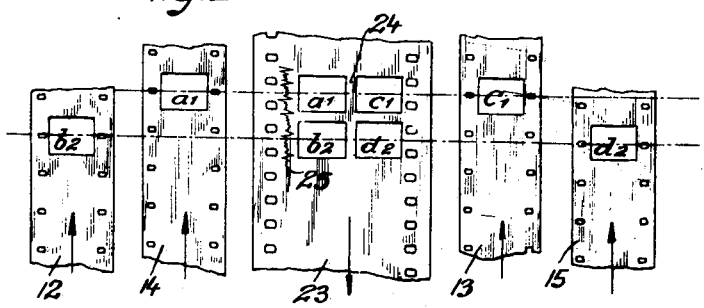
Fig. 2 illustrates the position of the four narrow films bearing the color-component images constituting a group upon the copying on to a positive film of the standard or 18 x 25 mm. size.

Upon the copying process the one bipack film 12, 14, corresponding to the position in Fig. 2, will preferably record on the positive film 23 the superimposed component images on the left, whilst the second bipack film will provide the two remaining images. The single images on the narrow film can be copied on to the positive film without variation in their size, the green selection image $b^2$ of the film 12 being staggered in the copy in relation to the red component image $a^1$ to the extent of one advancing step of the narrow-gauge film. In similar fashion the blue record $c^1$ of the film 13 differs in its disposal on the positive film in relation to the black-and-white record $d^2$. Whereas, therefore, the narrow films 12, 14 and 13, 15 in Fig. 2 are moved upwards the positive film 23 is moved by one step downwards. The component images $a^1$, $b^2$, $c^1$, $d^2$ are united to form a group with a certain horizontal and vertical spacing 24, and the sound track 25 may be applied laterally. As compared with the showing in Fig. 1, the rays can be divided in the ray-dividing system 3 into two bundles which are disposed at an angle to one another, for example by allowing the deflected bundle 8 to leave the ray-dividing system in direct fashion and disposing the bipack film 12, 14 accordingly at the requisite point by means of deflecting rolls.

What we claim as new and desire to secure by Letters Patent is:

Apparatus for producing additive color films, comprising an upper coaxially supported pair of feed rolls, a lower coaxially supported pair of feed rolls, means for advancing two bipack films in relatively close edge spaced relation and along parallel paths across the upper and lower feed rolls, a light ray dividing lens system located between the upper and lower pairs of feed rolls and having a single light admitting face and two adjacent parallel light transmitting faces, one of said light transmitting faces being closer to the light admitting face than the other transmitting face and said system being designed in cooperation with the relative positions of the light transmitting faces to evenly divide light rays into two paths of substantially equal length between the admitting faces and the transmitting faces, a single objective disposed in advance of the said admitting face, guide roller members disposed in close proximity to said transmitting faces for maintaining the films closely adjacent the transmitting faces, and a rotary diaphragm between the objective and the light admitting face having a darkening sector of approximately 60°.

ADOLF H. KÄMPFER.
ALBERT SCHATTMANN.